United States Patent
Minarcin et al.

(10) Patent No.: US 8,612,074 B2
(45) Date of Patent: Dec. 17, 2013

(54) REGENERATIVE BRAKING CONTROL IN VEHICLES

(75) Inventors: Monika A. Minarcin, Northville, MI (US); Eric M. Rask, Chicago, IL (US); Jon K. Logan, Howell, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 675 days.

(21) Appl. No.: 12/776,201

(22) Filed: May 7, 2010

(65) Prior Publication Data

US 2011/0276243 A1 Nov. 10, 2011

(51) Int. Cl.
*B60L 3/00* (2006.01)

(52) U.S. Cl.
USPC .............................. 701/22; 701/71

(58) Field of Classification Search
USPC ............................... 701/21, 70–71
See application file for complete search history.

(56) References Cited

U.S. PATENT DOCUMENTS

| | | |
|---|---|---|
| 5,895,100 A | 4/1999 | Ito et al. |
| 6,116,368 A | 9/2000 | Lyons et al. |
| 6,687,593 B1* | 2/2004 | Crombez et al. ................ 701/71 |
| 7,479,761 B2* | 1/2009 | Okumura ...................... 320/132 |
| 2004/0210356 A1* | 10/2004 | Wilton et al. .................... 701/22 |
| 2007/0018608 A1* | 1/2007 | Okumura ...................... 320/104 |
| 2009/0118888 A1* | 5/2009 | Minarcin et al. ................ 701/22 |
| 2009/0227418 A1* | 9/2009 | Farnsworth ....................... 477/7 |
| 2011/0074204 A1* | 3/2011 | Kim ................................. 303/3 |
| 2011/0112711 A1* | 5/2011 | Liu et al. ......................... 701/22 |
| 2011/0312468 A1* | 12/2011 | Ito et al. ......................... 477/15 |

* cited by examiner

*Primary Examiner* — Hussein A. Elchanti

(74) *Attorney, Agent, or Firm* — Ingrassia Fisher & Lorenz, P.C.

(57) ABSTRACT

Methods and systems for modulating regenerative braking in a vehicle having a regenerative braking system and an energy storage system are provided. A value is obtained for a variable pertaining to a condition that affects energy absorption of the energy storage system. A regenerative braking torque capacity for the regenerative braking system is determined using the value. Regenerative braking is controlled via the regenerative braking system based at least in part on the regenerative braking torque capacity.

19 Claims, 3 Drawing Sheets

REGENERATIVE BRAKING CONTROL IN VEHICLES

TECHNICAL FIELD

The disclosed subject matter generally relates to the field of vehicles and, more specifically, to methods and systems for controlling regenerative braking in vehicles.

BACKGROUND

Automobiles and various other vehicles include braking systems for reducing vehicle speed or bringing the vehicle to a stop. Such braking systems generally include a controller that regulates the delivery of braking pressure to braking calipers on one or both axles of the vehicle to produce braking torque for the vehicle. For example, in a regenerative braking system, hydraulic or other braking pressure is generally provided for both a non-regenerative braking axle and a regenerative braking axle. Many electric vehicles, hybrid electric, and fuel cell electric vehicles attempt to maximize regenerative braking in order to maximize energy capture to the vehicle energy storage system, thus providing greater fuel economy and/or greater vehicle range. However, the power throughput changes that may occur when attempting to maximize the regenerative energy capture can result in uneven braking feel, thereby providing a less than optimal experience for the driver and/or passengers of the vehicle.

Accordingly, it is desirable to provide an improved method and a system for controlling regenerative braking in vehicles. Furthermore, other desirable features and characteristics of the methods and systems will be apparent from the subsequent detailed description and the appended claims, taken in conjunction with the accompanying drawings and the foregoing technical field and background.

SUMMARY

In accordance with an exemplary embodiment, a method for controlling regenerative braking in a vehicle having a regenerative braking system and an energy storage system is provided. The method comprises the steps of obtaining a value for a variable that affects energy absorption of the energy storage system, determining a regenerative braking torque capacity for the regenerative braking system using the value, and providing the regenerative braking torque via the regenerative braking system based at least in part on the regenerative braking torque capacity.

In accordance with another exemplary embodiment, a system for controlling regenerative braking in a vehicle having a regenerative braking system and an energy storage system is provided. The system comprises a memory and a processor. The memory is configured to store a value for a variable pertaining to a condition that affects energy absorption of the energy storage system. The processor is coupled to the memory, and is configured to determine a regenerative braking torque capacity for the regenerative braking system using the value and control the regenerative braking torque via the regenerative braking system based at least in part on the regenerative braking torque capacity.

In accordance with a further exemplary embodiment, a system for controlling regenerative braking in a vehicle having a regenerative braking system and an energy storage system and a motor coupled to the regenerative braking system is provided. The system comprises a first sensor, a second sensor, and a controller. The first sensor is configured to measure a first value for a first variable pertaining to a state of the energy storage system. The second sensor is configured to measure a second value for a second variable pertaining to a state of the motor. The controller is coupled to the first sensor and the second sensor, and is configured to determine a regenerative braking torque capacity for the regenerative braking system using the first value and the second value and control the regenerative braking torque based at least in part on the regenerative braking torque capacity.

BRIEF DESCRIPTION OF THE DRAWINGS

Certain embodiments of the present invention will hereinafter be described in conjunction with the following drawing figures, wherein like numerals denote like elements, and wherein.

DETAILED DESCRIPTION

The following detailed description is merely exemplary in nature, and is not intended to limit the application and uses thereof. Furthermore, here is no intention to be bound by the preceding background or the following detailed description.

Figure 1:
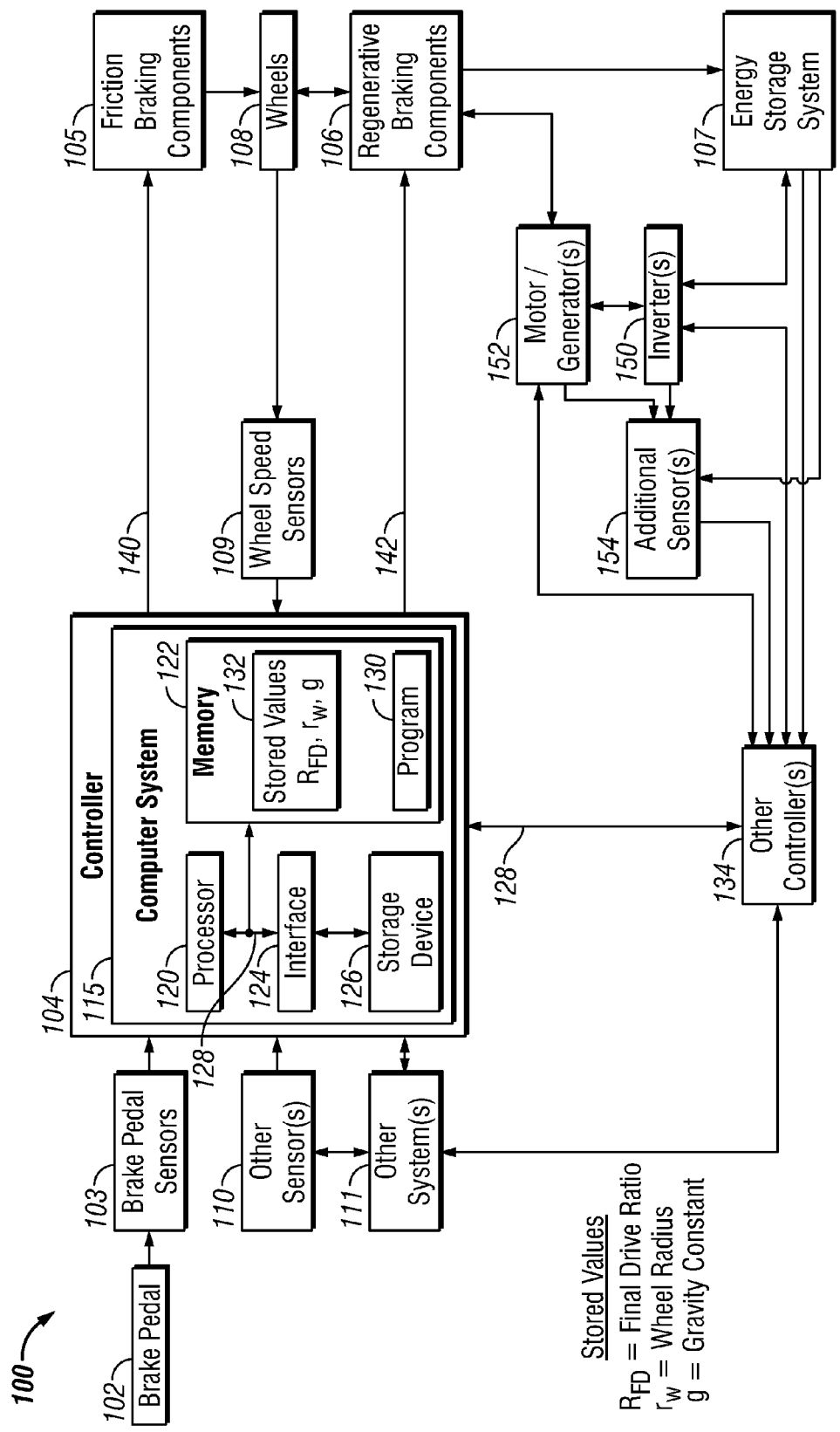
FIG. 1 is a functional block diagram of a braking system for a vehicle, such as a hybrid electric vehicle, fuel cell electric vehicle, or electric vehicle, in accordance with an exemplary embodiment.

FIG. 1 is a block diagram of an exemplary braking system 100 for use in a brake-by-wire system of a vehicle, such as an automobile. The braking system 100 is a combined system providing both regenerative and conventional braking. In a preferred embodiment, the vehicle is an automobile, such as a sedan, a sport utility vehicle, a van, or a truck. In various embodiments, the vehicle is a hybrid electric vehicle, fuel cell electric vehicle, or electric vehicle. However, the type of vehicle may vary in different embodiments.

As depicted in FIG. 1, the braking system 100 includes a brake pedal 102, brake pedal sensors 103, a controller 104, friction braking components 105, regenerative braking components 106, an energy storage system (ESS) 107, one or more inverters 150, and one or more motors 152. The braking system 100 is used in connection with a first axle 140 and a second axle 142. Each of the first and second axles 140, 142 has one or more wheels 108 of the vehicle disposed thereon. As depicted in FIG. 1, in certain embodiments the braking system 100 also includes one or more wheel speed sensors 109, one or more other systems 111 (e.g. a gear or transmission unit) coupled to one or more other sensors 110, various additional sensors 154. and other controllers 134 connected to the brake system controller 104.

The friction braking components 105 and the regenerative braking components 106 preferably comprise friction braking units 105 and regenerative braking units 106, respectively. In a preferred embodiment, the friction braking units 105 are disposed along a first axle 140 of the vehicle along with certain of the wheels 108, and the regenerative braking units 106 are disposed along a second axle 142 of the vehicle along with certain other of the wheels 108. In a preferred embodiment, the first axle 140 is a non-regenerative braking axle coupled to the friction braking components 105, and the second axle 142 is a regenerative braking axle 142 coupled to the regenerative braking components 106. In certain other embodiments, the first axle 140 and the second axle 142 are both regenerative braking axles coupled to the regenerative braking components 106, and regenerative braking is provided to each of the wheels 108.

The brake pedal 102 provides an interface between an operator of a vehicle and a braking system or a portion thereof, such as the braking system 100, which is used to slow or stop the vehicle. To initiate the braking system 100, an operator would typically use his or her foot to apply a force to the brake pedal 102 to move the brake pedal 102 in a generally downward direction. In one preferred embodiment the braking system 100 is an electro-hydraulic system. In another preferred embodiment, the braking system 100 is a hydraulic system.

The brake pedal sensors 103 are coupled between the brake pedal 102 and the controller 104. Specifically, in accordance with various preferred embodiments, the brake pedal sensors 103 preferably include one or more brake pedal force sensors and/or one or more brake pedal travel sensors. The number of brake pedal sensors 103 may vary. For example, in certain embodiments, the braking system 100 may include a single brake pedal sensor 103. In various other embodiments, the braking system 100 may include any number of brake pedal sensors 103.

The brake pedal travel sensors, if any, of the brake pedal sensors 103 provide an indication of how far the brake pedal 102 has traveled, which is also known as brake pedal travel, when the operator applies force to the brake pedal 102. In one exemplary embodiment, brake pedal travel can be determined by how far an input rod in a brake master cylinder has moved.

The brake pedal force sensors, if any, of the brake pedal sensors 103 determine how much force the operator of braking system 100 is applying to the brake pedal 102, which is also known as brake pedal force. In one exemplary embodiment, such a brake pedal force sensor, if any, may include a hydraulic pressure emulator and/or a pressure transducer, and the brake pedal force can be determined by measuring hydraulic pressure in a master cylinder of the braking system 100.

Regardless of the particular types of brake pedal sensors 103, the brake pedal sensors 103 detect one or more values (such as brake pedal travel and/or brake pedal force) pertaining to the drivers' engagement of the brake pedal 102. The brake pedal sensors 103 also provide signals or information pertaining to the detected values pertaining to the driver's engagement of the brake pedal 102 to the controller 104 for processing and for use by the by the computer system 115 thereof in determining the driver intended braking torque for the vehicle.

Various sensors, controllers, and/or processors provide information to the controller 104 for use in controlling regenerative braking for the vehicle. In certain embodiments. Specifically, information is provided to the controller 104 pertaining to the energy storage system 107, the wheels 108, the inverters 150, the motors 152, and other systems 111 such as a transmission or engine unit.

In certain embodiments, some or all of the wheels 108, the inverters 150, the motors 152, and the other systems 111 may be coupled to various sensors (such as the wheel speed sensors 109, the other sensors 110, and the additional sensors 154) that measure values pertaining to such devices and provide signals representative thereof to the controller 104 and/or to one or more other controllers 134. For example, in one such embodiment, (i) the wheel speed sensors 109 provide information as to movement, speed, or slip of the wheels 108 to the controller 104 and/or to one or more other controllers 134; (ii) the other sensors 110 provide information as to values pertaining to the other systems 111 or the vehicle as a whole, such as transmission, gear state (e.g., drive, reverse, and neutral), or operating mode (for example, torque assist, regenerative braking, idle, coasting, and the like) to the controller 104 and/or to one or more other controllers 134; (iii) certain of the additional sensors 154 are coupled to the energy storage system 107 and provide information as to power limits (for example, voltage and current limits) of the energy storage system 107, a state of charge, a state of energy, and/or a temperature of the energy storage system 107, and the like to the controller 104 and/or to one or more other controllers 134; (iv) certain other additional sensors 154 are coupled to the inverters 150 and provide information as to the inverters 150 (such as voltages of the inverters 150, temperatures of the inverters 150, and the like) to the controller 104 and/or to one or more other controllers 134; and (v) certain other additional sensors 154 are coupled to the motors 152 and provide information as to the motors 152 (for example, temperatures, speeds, input power, output power, and the like pertaining to the motors 152) to the controller 104 and/or to one or more other controllers 134.

In certain other embodiments, some or all of such information may be generated by controllers associated with these devices. For example, in certain embodiments, some or all of the wheels 108, the inverters 150, the motors 152, and the other systems 111 may be associated with respective controllers or processors, instead of or in addition to the above-referenced sensors. Such respective controllers may perform algorithms to generate the desired information pertaining to these devices (such as the values referenced in the immediately preceding paragraph) and then provide the generated output to the controller 104 and/or to one or more other controllers 134.

The controller 104 is coupled between the brake pedal sensors 103, the friction braking components 105, the regenerative braking components 106, the energy storage system 107, the other systems 111, various controllers thereof (if any), the other controllers 134, the various sensors 109, 110, and 154, and the first and second axles 140, 142. Specifically, the controller 104 monitors the driver's engagement of the brake pedal 102 and the measurements from the brake pedal sensors 103 and information pertaining to the energy storage system 107, the other systems 111, various controllers thereof (if any), the other controllers 134, and the various sensors 109, 110, and 154, provides various calculations and determinations pertaining thereto, including a desired rate of change of regenerative braking torque based on variables that may affect energy absorption of the energy storage system 107 (to thereby make blending of regenerative braking torque and friction braking torque smoother), and modulates regenerative braking and friction braking of the vehicle accordingly via braking instructions or commands sent to the regenerative braking units 106 and the friction braking components 105 by the controller 104 along the second axle 142 and the first axle 140, respectively.

Per the discussion above, different controllers (each preferably comprising different respective computer systems and/or processors) may be utilized in conjunction with the braking system 100. For example, in one exemplary embodiment depicted in FIG. 1, one of the other controllers 134 is coupled between the controller 104 and the energy storage system 107. Accordingly, in the depicted embodiment, the controller 104 is directly coupled to each of the other controllers 134, and is thereby directly or indirectly coupled to each component of the braking system 100. For example, one such other controller 134 establishes the limits for the energy storage system 107, such as for state of charge, state of energy, power limits, current limits, and voltage limits. In certain embodiments other limits may also be imposed. For example, in a FWD (front wheel drive) or RWD (rear wheel drive) 2 Mode Hybrid configuration, there may also be an intermediary controller (such as a hybrid control processor) coupled to the storage system controller 134 that may further reduce the capability of the energy storage system 107 to effective accept electrical charge. In addition, in certain instances a system restriction, for example due to component wear, may also reduce the effective acceptance of the electrical charge by the energy storage system 107. One or more other controllers 134 may similarly be coupled between the controller 104 and one or more of the following: the other systems 111, the inverters 150, the motors 152, and/or the wheel speed sensors 109, among other possible examples.

In the depicted embodiment, the controller 104 comprises a computer system 115. In certain embodiments, the controller 104 may also include one or more of the brake pedal sensors 103, among other possible variations. In addition, it will be appreciated that the controller 104 may otherwise differ from the embodiment depicted in FIG. 1, for example in that the controller 104 may be coupled to or may otherwise utilize one or more remote computer systems and/or other control systems.

In the depicted embodiment, the computer system 115 is coupled between the brake pedal sensors 103, the friction braking components 105, the regenerative braking components 106, the energy storage system 107, the other systems 111, various controllers thereof (if any), the other controllers 134, the various sensors 109, 110, and 154, and the first and second axles 140, 142. The computer system 115 receives the signals or information from the brake pedal sensors 103, the energy storage system 107, the other systems 111, various controllers thereof (if any), the other controllers 134, and the various sensors 109, 110, and 154, and further processes these signals or information in order to control braking of the vehicle and apply appropriate amounts of braking torque or pressure to the friction braking components 105 and the regenerative braking components 106 along the first axle 140 and the second axle 142, respectively, via braking commands provided by the computer system 115 to the friction braking components 105 and the regenerative braking components 106. In a preferred embodiment, these and other steps are conducted in accordance with the process 200 depicted in FIGS. 2 and 3 and described further below in connection therewith.

In the depicted embodiment, the computer system 115 includes a processor 120, a memory 122, an interface 124, a storage device 126, and a bus 128. The processor 120 performs the computation and control functions of the computer system 115 and the controller 104, and may comprise any type of processor or multiple processors, single integrated circuits such as a microprocessor, or any suitable number of integrated circuit devices and/or circuit boards working in cooperation to accomplish the functions of a processing unit. During operation, the processor 120 executes one or more programs 130 contained within the memory 122 and, as such, controls the general operation of the controller 104 and the computer system 115, preferably in executing the steps of the processes described herein, such as the process 200 depicted in FIGS. 2 and 3 and described further below in connection therewith.

The memory 122 can be any type of suitable memory. This would include the various types of dynamic random access memory (DRAM) such as SDRAM, the various types of static RAM (SRAM), and the various types of non-volatile memory (PROM, EPROM, and flash). The memory can reside on, or at least co-located with the processor on the same chip. The bus 128 serves to transmit programs, data, status and other information or signals between the various components of the computer system 115. In a preferred embodiment, the memory 122 stores the above-referenced program 130 along with one or more stored look-up tables and/or values 132 that are used in controlling the regenerative braking of the regenerative braking components 106 and the friction braking of the friction braking components 105 in accordance with steps of the process 200 depicted in FIGS. 2 and 3 and described further below in connection therewith.

The interface 124 allows communication to the computer system 115, for example from a system driver and/or another computer system, and can be implemented using any suitable method and apparatus. It can include one or more network interfaces to communicate with other systems or components. The interface 124 may also include one or more network interfaces to communicate with technicians, and/or one or more storage interfaces to connect to storage apparatuses, such as the storage device 126.

The storage device 126 can be any suitable type of storage apparatus, including direct access storage devices such as hard disk drives, flash systems, floppy disk drives and optical disk drives. In one exemplary embodiment, the storage device 126 comprises a program product from which memory 122 can receive a program 130 that executes one or more of the processes described herein, such as the process 200 of FIGS. 2 and 3 or portions thereof. In another exemplary embodiment, the program product may be directly stored in and/or otherwise accessed by the memory 122 and/or a disk, such as that referenced below.

The bus 128 can be any suitable physical or logical means of connecting computer systems and components. This includes, but is not limited to, direct hard-wired connections, fiber optics, infrared and wireless bus technologies. During operation, the program 130 is stored in the memory 122 and executed by the processor 120. In certain embodiments, a bus 128 (which may be the same bus or a different bus as the bus 128 of the computer system 115) is also similarly coupled between the controller 104 and the other controllers 134.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of computer-readable signal bearing media include: flash memory, floppy disks, hard drives, memory cards and optical disks. It will similarly be appreciated that the computer system 115 may also otherwise differ from the embodiment depicted in FIG. 1, for example in that the computer system 115 may be coupled to or may otherwise utilize one or more remote computer systems and/or other control systems.

The friction braking units 105 are coupled between the controller 104 and the wheels 108. In the depicted embodiment, the friction braking units 105 are disposed along the first axle 140 and are coupled to certain wheels 108 on the first axle 140. The friction braking units 105 receive friction braking commands from the controller 104, and are controlled thereby accordingly. The friction braking units 105 can include any number of different types of devices that, upon receipt of braking commands, can apply the proper braking torque as received from the controller 104. For example, in an electro-hydraulic system, the friction braking units 105 can comprise an actuator that can generate hydraulic pressure that can cause brake calipers to be applied to a brake disk to induce friction to stop a vehicle. Alternatively, in an electro-mechanical brake-by-wire system, the friction braking units 105 can comprise a wheel torque-generating device that operates as a vehicle brake.

The regenerative braking units 106 are also coupled between the controller 104 and the wheels 108. In the depicted embodiment, the regenerative braking units 106 are disposed along the second axle 142 and are coupled to certain wheels 108 on the second axle 142. The regenerative braking units 106 receive regenerative braking commands from the controller 104, and are controlled thereby accordingly. The regenerative braking units can include any number of different types of devices that, upon receipt of braking commands, can apply the proper braking torque as received from the controller 104. For example, in an electro-hydraulic system, the regenerative braking units 106 can comprise an actuator that can generate hydraulic pressure that can cause brake calipers to be applied to a brake disk to induce friction to stop a vehicle. Alternatively, in an electro-mechanical brake-by-wire system, the regenerative braking units 106 can comprise a wheel torque-generating device that operates as a vehicle brake.

The regenerative braking units 106, when applied, at least facilitate conversion of kinetic energy into electrical energy. The energy storage system 107 (for example, a battery or one or more ultracapacitor(s)) captures regenerative energy during braking of the regenerative braking components 106 as kinetic energy is transformed into electrical energy. In a preferred embodiment, the energy storage system 107 comprises a hybrid traction energy storage system for the regenerative braking components 106, and the regenerative power or energy that is captured is used for fraction power for the regenerative braking components 106.

The inverters 150 are coupled between the energy storage system 107 and the motors 152. In one embodiment, the inverters 150 comprise known complementary three-phase power electronics devices, each preferably including a plurality of insulated gate bipolar transistors (not shown) for converting direct current (DC) power from the energy storage system 107 to alternating current (AC) power for powering the motors/generators 152, by switching at high frequencies. Also in one embodiment, the insulated gate bipolar transistors form a switch mode power supply configured to receive control commands. Preferably there is one pair of insulated gate bipolar transistors for each phase of each of the three-phase electric machines. States of the insulated gate bipolar transistors may be controlled to provide motor drive mechanical power generation or electric power regeneration functionality. In certain embodiments, the braking system 100 may include or be coupled to one inverter 150 (for example, coupled to the energy storage system 107). In various other embodiments, the braking system 100 may have or be coupled to any number of the same or different types of inverters 150 (for example, coupled to the energy storage system 107).

The motors 152 are coupled between the inverter, the regenerative braking components 106, and an engine of the vehicle (not depicted). The motors 152 either generate or consume energy. During non-regenerative operation of the vehicle, power from the energy storage system 107 drives the vehicle, solely or in some combination with an engine (conventional or fuel cell, etc.). During regenerative braking, power will stored to the energy storage system 107 from regenerative braking. The energy storage system 107 is also charged in certain other states, such as coastdown energy or engine charging. During regenerative braking, the motors 152 harness regenerative braking energy from the regenerative braking components 106 for storage in the energy storage system 107 while in a regenerative operating mode. The use of the term "motor" herein shall refer to any type of vehicle motor, generator, or motor/generator. In certain embodiments, the braking system 100 may have one motor 152. In various other embodiments, the braking system 100 may have any number of the same or different types of motors 152.

In certain embodiments, the inverters 150, the motors 152, the energy storage system 107, and/or other components may reside outside the braking system, and/or may be part of one or more other modules or systems that are in operable communication with the braking system. Accordingly, in certain embodiments, the system 100 depicted in FIG. 1 may represent multiple systems or modules (for example, a braking system or module, a power electronics system or module, a powertrain system or module, and the like) that operate together. The system 100 may represent a simplified hybrid electric vehicle (HEV), elective vehicle (EV), or fuel cell electric vehicle (FCEV), among other possible examples. In certain embodiments, the inverters 150 and the motors 152 belong to one or more power electronics modules or systems of the vehicle coupled to the braking system 100 (for example, to the energy storage system 107 and/or other components thereof), the transmission and/or engine belong to one or more powertrain modules or systems similarly coupled to the braking system 100, and the energy storage system 107 may include a battery and, in certain embodiments, a fuel cell.

Figure 2:
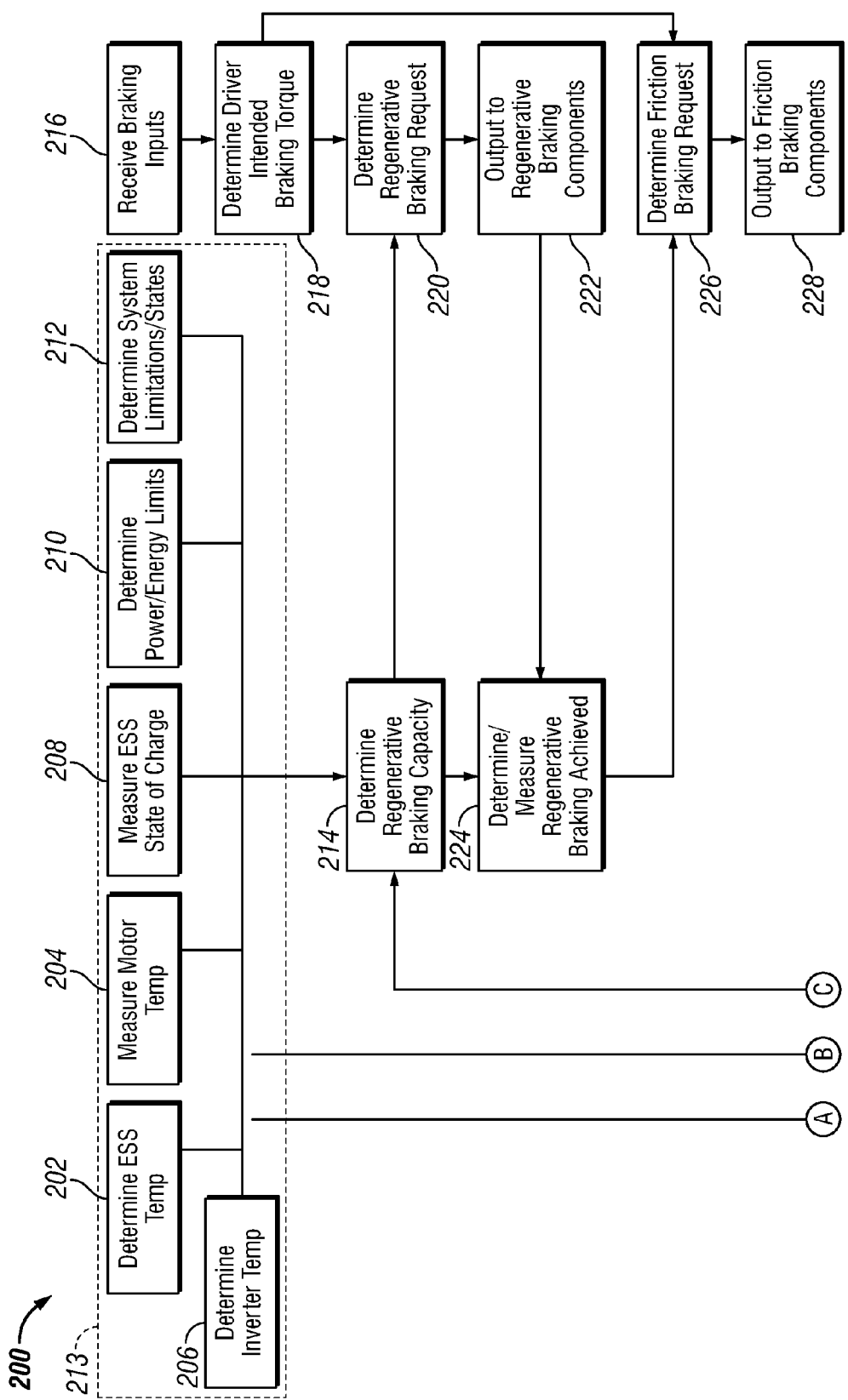
FIG. 2 is a flowchart of a process for modulating regenerative braking in a vehicle, such as a hybrid electric vehicle, fuel cell electric vehicle, or electric vehicle, and that can be utilized in connection with the braking system of FIG. 1, in accordance with an exemplary embodiment.

FIG. 2 is a flowchart of a process 200 for modulating regenerative braking in a vehicle, in accordance with an exemplary embodiment. The process 200 utilizes various input variables and calculations and determinations to provide smoother adjustments of regenerative braking torque in the vehicle and a smoother and more pleasant experience for the driver and passengers of the vehicle. The process 200 can be implemented in connection with the braking system 100 of FIG. 1, the controller 104, the computer systems 115 of FIG. 1, and/or the other controllers 134 of FIG. 1, also in accordance with an exemplary embodiment.

As depicted in FIG. 2, the process 200 begins with the step of receiving, measuring, determining, or calculating an energy storage system (ESS) temperature during operation of the vehicle (step 202). In a preferred embodiment, the energy storage system temperature is measured by one or more sensors and/or controllers associated with the energy storage system 107 of FIG. 1 and stored in the memory 122 of FIG. 1 as stored values 132 of FIG. 1 and/or provided directly to the processor 120 or one or more other controllers 134 of FIG. 1 for processing, most preferably continuously during operation of the vehicle. During each iteration of the process 200, the processor 120 or one or more other controllers 134 of FIG. 1 preferably processes the most recent or instantaneous values of this variable for use in the calculations and determinations performed by the processor 120 or one or more other controllers 134 of FIG. 1 and for ultimate use in modulating braking and controlling braking for the vehicle.

One or more motor temperatures are also received, measured, determined, or calculated during operation of the vehicle (step 204). In a preferred embodiment, the one or more motor temperatures are measured by one or more sensors and/or controllers associated with the motors 152 of FIG. 1 and stored in the memory 122 of FIG. 1 as stored values 132 of FIG. 1 and/or provided directly to the processor 120 or one or more other controllers 134 of FIG. 1 for processing, most preferably continuously during operation of the vehicle. During each iteration of the process 200, the processor 120 or one or more other controllers 134 of FIG. 1 preferably processes the most recent or instantaneous values of this variable for use in the calculations and determinations performed by the processor 120 or one or more other controllers 134 of FIG. 1 and for ultimate use in modulating braking and controlling braking for the vehicle.

An inverter temperature is also received, measured, determined, or calculated during operation of the vehicle (step 206). In a preferred embodiment, the inverter temperature is measured by one or more one or more sensors and/or controllers associated with the inverters 150 of FIG. 1 and stored in the memory 122 of FIG. 1 as stored values 132 of FIG. 1 and/or provided directly to the processor 120 or one or more other controllers 134 of FIG. 1 for processing, most preferably continuously during operation of the vehicle. During each iteration of the process 200, the processor 120 or one or more other controllers 134 of FIG. 1 preferably processes the most recent or instantaneous values of this variable for use in the calculations and determinations performed by the processor 120 or one or more other controllers 134 of FIG. 1 and for ultimate use in modulating braking and controlling braking for the vehicle.

An energy storage system state of charge is also received, measured, determined, or calculated during operation of the vehicle (step 208). In a preferred embodiment, the energy storage system state of charge is measured by one or more sensors and/or controllers associated with the energy storage system 107 of FIG. 1 and stored in the memory 122 of FIG. 1 as stored values 132 of FIG. 1 and/or provided directly to the processor 120 or one or more other controllers 134 of FIG. 1 for processing, most preferably continuously during operation of the vehicle. During each iteration of the process 200, the processor 120 or one or more other controllers 134 of FIG. 1 preferably processes the most recent or instantaneous values of these variables for use in the calculations and determinations performed by the processor 120 or one or more other controllers 134 of FIG. 1 and for ultimate use in modulating braking and controlling braking for the vehicle.

In addition, one or more energy storage system power and/or energy limits are also received, measured, determined, or calculated during operation of the vehicle (step 210). In a preferred embodiment, the energy storage system power and/or energy limits are measured by one or more sensors and/or possibly through the arbitration of temperature, aging effects, capacities, voltage and/or current limits for that particular cell chemistry and/or controllers associated with the energy storage system 107 of FIG. 1 and stored in the memory 122 of FIG. 1 as stored values 132 of FIG. 1 and/or provided directly to the processor 120 or one or more other controllers 134 of FIG. 1 for processing, most preferably continuously during operation of the vehicle. During each iteration of the process 200, the processor 120 or one or more other controllers 134 of FIG. 1 preferably processes the most recent or instantaneous values of these variables for use in the calculations and determinations performed by the processor 120 or one or more other controllers 134 of FIG. 1 and for ultimate use in modulating braking and controlling braking for the vehicle.

One or more system limitations or states are also received, measured, determined, or calculated during operation of the vehicle (step 212). In a preferred embodiment, the system limitations or states include states, limitations, or other information regarding other systems of the vehicle (such as a mode of a gear or a transmission of the vehicle). Also in a preferred embodiment, the one or more system limitations or states are determined by one or more sensors and/or controllers associated with one or more of the other systems 111 of FIG. 1 (such as a vehicle gear or transmission system) and stored in the memory 122 of FIG. 1 as stored values 132 of FIG. 1 and/or provided directly to the processor 120 or one or more other controllers 134 of FIG. 1 for processing, most preferably continuously during operation of the vehicle. During each iteration of the process 200, the processor 120 or one or more other controllers 134 of FIG. 1 preferably processes the most recent or instantaneous values of these variables for use in the calculations and determinations performed by the processor 120 or one or more other controllers 134 of FIG. 1 and for ultimate use in modulating braking and controlling braking for the vehicle.

Steps 202-212 are also denoted in FIG. 2 as a combined step 213. During the combined step 213, values are obtained for variables that may affect the energy absorption by the energy storage system 107 of FIG. 1. In one exemplary embodiment, the variables comprise one or more variables that could, in essence, be considered as an absorber of energy or that could otherwise be considered as having an adverse effect on the ability of the energy storage system to absorb energy. The variables may be related directly or indirectly to the energy storage system 107 of FIG. 1. A variable may be indirectly related to the energy storage system 107 of FIG. 1, for example, if the variable may limit the torque capability of the regenerative braking components 106 and/or the motor. In certain embodiments and/or in certain iterations of the process 200, values may be obtained during the combined step 213 for a subset of one or more of the variables of steps 202-212, and/or other values for other variables may be obtained. In a preferred embodiment, values for each of the variables from step 202-212 are obtained continuously during each iteration of the process 200.

Figure 3:
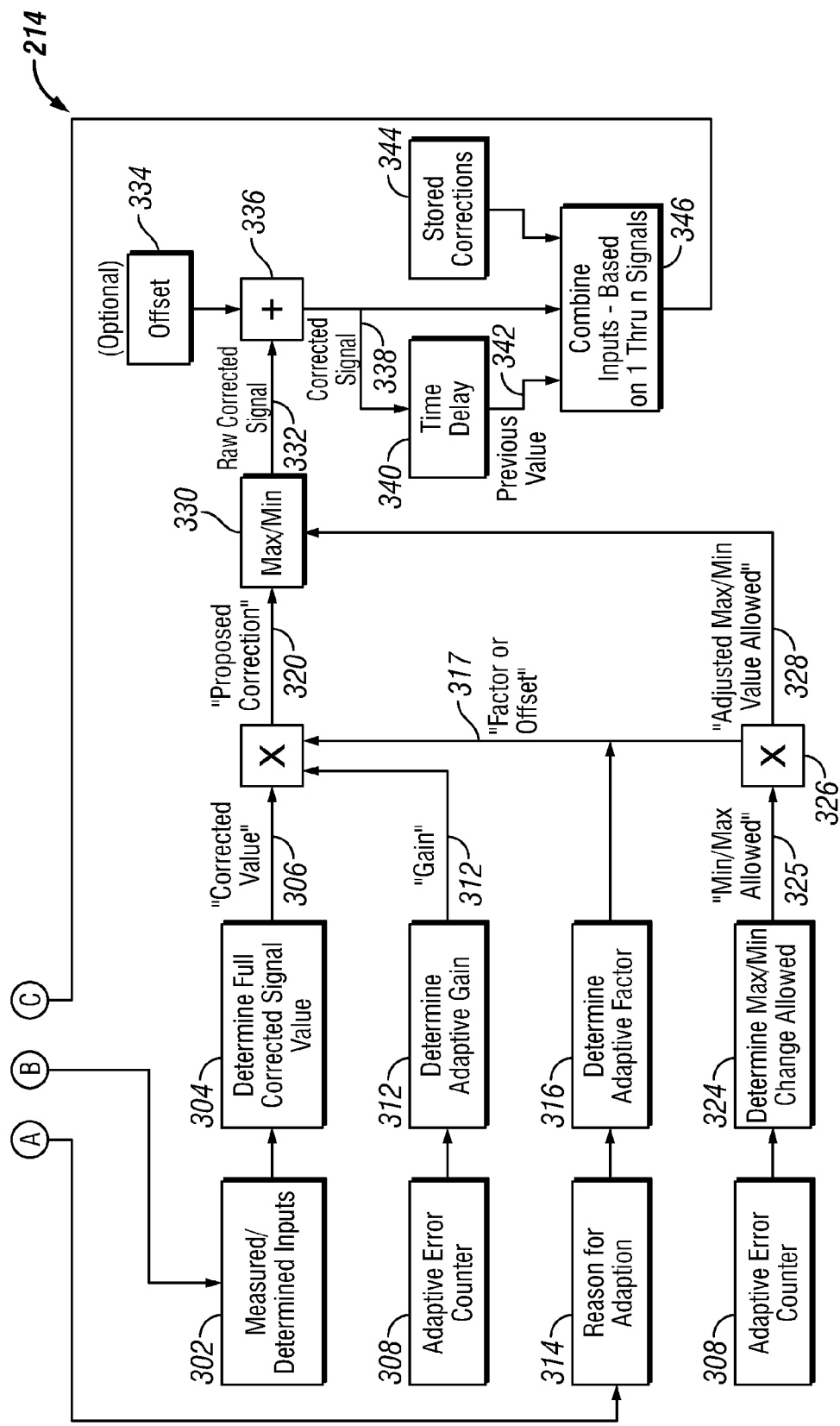
FIG. 3 is a flowchart of a first embodiment of a sub-process of a step of the process of FIG. 2, namely the step of calculating various input values for use in determining a regenerative braking capacity for use in the process of FIG. 2, in accordance with an exemplary embodiment.

Turning now to FIG. 3, a flowchart is provided for the combined step 213 of FIG. for determining the various parameter values of steps 202-212, in accordance with an exemplary embodiment. The process is depicted in FIG. 2 with respect to a single input parameter n. However, as described in greater detail further below, the steps depicted in FIG. 3 are repeated for each of the input parameters from steps 202-212 (namely, ESS temperature, motor temperatures, inverter temperature, ESS state of charge, ESS power/energy limits, and system limitations or states).

As depicted in FIG. 3, measured or determined inputs from a current input parameter n are measured or determined (step 302). In one iteration of step 302, the input parameter n comprises the ESS temperature of step 202 of FIG. 2. In other iterations of step 302, the input parameter n comprises one of the following (namely, one per iteration): the motor temperatures of step 204 of FIG. 2, the inverter temperature of step 206 of FIG. 2, the ESS state of charge 208 of step 208 of FIG. 2, the power/energy limits of step 210 of FIG. 2, and the system limitations or states of step 212 of FIG. 2.

A full correction signal value is determined for the particular input parameter n of the current iteration based on the parameter value determined in the current iteration of step 302 (step 304), to thereby yield a corrected value 306. The corrected value represents a corrected value of regenerative braking torque based on the particular input parameter n of the current iteration of the process of FIG. 3. The corrected value 306 is preferably determined by the processor 120 or one or more other controllers 134 of FIG. 1.

During an iteration in which the energy storage system temperature of step 202 of FIG. 2 is utilized as the input parameter n of step 302, the corrected value 306 preferably represents a maximum regenerative braking when the energy storage system temperature is within a normal or healthy temperature range, specifically, when the energy storage system temperature is greater than a first predetermined ESS temperature value and less than a second predetermined ESS temperature value. Conversely, the corrected value 306 preferably represents a limited regenerative braking torque when the energy storage system temperature is outside the normal or healthy temperature range, specifically, when the energy storage system temperature is less than the first predetermined ESS temperature value or greater than the second predetermined ESS temperature value.

During an iteration in which the motor temperatures of step 204 of FIG. 2 are utilized as the input parameter n of step 302, the corrected value 306 preferably represents a maximum regenerative braking when the one or more motor temperatures are within a normal or healthy temperature range, specifically, when the motor temperature is less than a predetermined motor temperature. Conversely, the corrected value 306 preferably represents a limited regenerative braking torque when the one or more motor temperatures are outside the normal or healthy temperature range, specifically, when such a motor temperature is greater than the predetermined motor temperature.

During an iteration in which the inverter temperature of step 206 of FIG. 2 is utilized as the input parameter n of step 302, the corrected value 306 preferably represents a maximum regenerative braking when the inverter temperature is within a normal or healthy temperature range, specifically, when the inverter temperature is greater than a first predetermined inverter temperature value and less than a second predetermined inverter temperature value. Conversely, the corrected value 306 preferably represents a limited regenerative braking torque when the inverter temperature is outside the normal or healthy temperature range, specifically, when the inverter temperature is less than the first predetermined inverter temperature value or greater than the second predetermined inverter temperature value.

During an iteration in which the state of charge of step 208 of FIG. 2 is utilized as the input parameter n of step 302, the corrected value 306 preferably represents a maximum regenerative braking when the state of charge is within a normal or healthy range, specifically, when the state of charge is greater than a first predetermined state of charge value and less than a second predetermined state of charge value. Conversely, the corrected value 306 preferably represents a limited regenerative braking torque when the state of charge is outside the normal or healthy range, specifically, when the state of charge is less than the first predetermined state of charge value or greater than the second predetermined state of charge value.

During an iteration in which the power and/or energy limits of step 210 of FIG. 2 are utilized as the input parameter n of step 302, the corrected value 306 preferably represents a maximum regenerative braking when the power and/or energy limits are within a normal or healthy range, specifically, when the power and/or energy limits are greater than a first predetermined power and/or energy limits value and less than a second predetermined power and/or energy limits value. Conversely, the corrected value 306 preferably represents a limited regenerative braking torque when the power and/or energy limits are outside the normal or healthy range, specifically, when the power and/or energy limits are less than the first predetermined power and/or energy limits value or greater than the second predetermined power and/or energy limits value.

During an iteration in which system limitations or states or other parameters of step 212 of FIG. 2 are utilized as the input parameter n of the current iteration, various different criteria may be utilized in determining the corrected value 306 for such input parameter n.

Next, in steps 308-330, gain and maximum change factors are calculated and applied against the corrected value 306 for the input parameter n of the current iteration. In a preferred embodiment, the gain and maximum change factors perform converged and non-converged adaptive modification functions. Also in a preferred embodiment, the gain (which can be obtained from information utilized to extend warranty of the system components or to allow for maximal customer perception of regenerative braking) provides a weight or an authority provided to adaptively modify the input parameter n of the current iteration.

First, in step 308, an adaptive error counter is obtained for the respective input parameter n utilized in a particular iteration (step 308). The adaptive error counter indicates a recent trend of adaptive increasing or decreasing of the gain factor for the input parameter n of the current iteration. For example, if the error counter reflects that the current trend of the gain factor for the input parameter n of the current iteration indicates many modifications in the same direction (for example, more than sixty percent of the time in a given sample), then additional authority will be given to the adaptive modification. The adaptive error counter is preferably stored in the memory 122 of FIG. 1 as one of the stored values 132 and/or as stored values in memory of one or more of the other controllers 134 of FIG. 1, and is preferably obtained by the processor 120 or one or more other controllers 134 of FIG. 1 from the memory 122 (and/or memory of one or more of the other controllers 134 of FIG. 1) during step 308.

The adaptive gain is then determined using the adaptive error counter (step 312). The resulting adaptive gain 313 is preferably determined by the processor 120 or one or more other controllers 134 of FIG. 1 using the adaptive error counter of step 308 and a look-up table. The look-up table of step 312 is preferably stored in the memory 122 of FIG. 1 as one of the stored values 132 and/or as stored values in memory of one or more of the other controllers 134 of FIG. 1, and is preferably obtained by the processor 120 or one or more other controllers 134 of FIG. 1 from the memory 122 (and/or memory of one or more of the other controllers 134 of FIG. 1) during step 312.

In addition, a reason for adapting the input parameter n of the current iteration is obtained (step 314). The reason for adapting of step 314 preferably corresponds to a state of one or more components of the braking system 100 of FIG. 1 that is likely to have an effect on the input parameter n of the current iteration. The reason for adapting the input parameter n of the current iteration is preferably determined by the processor 120 or one or more other controllers 134 of FIG. 1.

An adaptive factor is then determined using the reason for adapting (step 316). The resulting adaptive factor 317 serves as a representation of how reliable the corrected value 306 is determined to be. The adaptive factor allows for a percentage of the corrected value 306 to be applied to the adaptive modification. The adaptive factor allows for smaller adaptive corrections for cases in which the computations or measurements for the input factor n of the current iteration are believed to be relatively less reliable than normal, and/or when there may be risks (e.g. of wear on components of the braking system 100 of FIG. 1) of overcorrecting the adjustment in the regenerative braking torque associated with the corrected value 306. The adaptive factor is preferably determined by the processor 120 or one or more other controllers 134 of FIG. 1 using the reason for adapting of step 314 and a look-up table. The look-up table of step 316 is preferably stored in the memory 122 of FIG. 1 as one of the stored values 132 and/or as stored values in memory of one or more of the other controllers 134 of FIG. 1, and is preferably obtained by the processor 120 or one or more other controllers 134 of FIG. 1 from the memory 122 (and/or memory of one or more of the other controllers 134 of FIG. 1) during step 316.

The corrected value 306, the adaptive gain 313, and the adaptive factor 317 are multiplied together in step 318 to generate a proposed correction 320. The proposed correction 320 accounts for the history of adjustments and reliability for the input parameter n of the current iteration. The proposed correction 320 represents a desired regenerative braking torque adjustment based on the input parameter n of the current iteration that is a percentage of the corrected value 306 for the input parameter n of the current iteration after adjustments for the adjustment history and parameter reliability via the adaptive gain 313 and the adaptive factor 317, respectively. The proposed correction 320 is preferably calculated by the processor 120 or one or more other controllers 134 of FIG. 1.

In addition, the adaptive error counter of step 308 is also used in determining a maximum or minimum change for the system (step 324). In a preferred embodiment, the resulting maximum or minimum change 325 represents a maximum or minimum amount or rate of change of regenerative braking torque allowed by the braking system 100 of FIG. 1. The maximum or minimum change is preferably determined by the processor 120 or one or more other controllers 134 of FIG. 1 using the adaptive error counter of step 308 and a look-up table. The look-up table of step 324 is preferably stored in the memory 122 of FIG. 1 as one of the stored values 132 and/or as stored values in memory of one or more of the other controllers 134 of FIG. 1, and is preferably obtained by the processor 120 or one or more other controllers 134 of FIG. 1 from the memory 122 (and/or memory of one or more of the other controllers 134 of FIG. 1) during step 324.

The maximum or minimum change 325 is then multiplied by the adaptive factor 317 in step 326 to generate an adjusted maximum or minimum change value 328. The adjusted maximum or minimum change value 328 represents an adjustment of the maximum or minimum change 325 to account for a measure of reliability of the determinations or measurements of the input parameter n of the current iteration via the adaptive factor 317. The adjusted maximum or minimum change value 328 is preferably calculated by the processor 120 or one or more other controllers 134 of FIG. 1.

The adjusted maximum or minimum change value 328 is then applied to the proposed correction 320 (step 330), thereby generating a raw corrected signal 332 for the particular input parameter n of the current iteration. Specifically, if an absolute value of the proposed correction 320 is less than or equal to an absolute value of the adjusted maximum or minimum change 328, then the bounded correction 322 is equal to the proposed correction 320. Conversely, if the absolute value of the proposed correction 320 is greater than the absolute value of the adjusted maximum or minimum change 328, then the bounded correction 322 is equal to the maximum or minimum change 328. The bounded correction is preferably determined in step 330 by the processor 120 or one or more other controllers 134 of FIG. 1.

In certain embodiments, an offset correction 334 is also applied to the raw corrected signal 332 in step 336 to generate a corrected signal 338. The offset correction 334 preferably corresponds to a correction corresponding to a calibration value for the particular input parameter n of the current iteration based on the particular type of vehicle or a particular mode of operation thereof. For example, the offset correction may be related to a sport mode operation or a four by four operation of the vehicle. The offset correction 334 is preferably stored in the memory 122 of FIG. 1 as one of the stored values 132 and/or as stored values in memory of one or more of the other controllers 134 of FIG. 1, and is retrieved and applied by the processor 120 or one or more other controllers 134 of FIG. 1 during step 336. In a preferred embodiment, the processor 120 or one or more other controllers 134 of FIG. 1 adds the offset correction 334 to the raw corrected signal 332 in step 336 to generate the corrected signal 338.

In addition, a time delay is introduced in step 340, so that a previous value 342 (i.e., from just prior to the time delay) of the corrected signal 338 is utilized for the subsequent calculations of FIG. 3. The time delay is preferably implemented by the processor 120 or one or more other controllers 134 of FIG. 1. In a preferred embodiment, the time delay is equal to approximately twenty milliseconds (ms); however, this may vary in other embodiments.

The corrected signal 338 (preferably the previous value 342 thereof, following the time delay) is then combined with stored corrections 344 (preferably stored in the memory 122 of FIG. 1 and/or memory of one or more of the other controllers 134 of FIG. 1) of the present parameter and the other parameters of the combined step 213 (step 346). In a preferred embodiment, each of these values are added together or otherwise combined by the processor 120 or one or more other controllers 134 of FIG. 1. In a preferred embodiment, an applied corrections sum is generated, and represents an input-based limit n for the particular input parameter n of the current iteration.

Steps 302-346 preferably repeat in various iterations. In a preferred embodiment, steps 302-346 are repeated multiple times for each of the particular input parameters of step 202-212 of FIG. 2. Specifically, steps 302-346 are preferably performed at multiple points in time (most preferably, continuously during operation of the vehicle) for each of the following input parameters: the ESS temperature of step 202, the motor temperature of step 204, the inverter temperature of step 206, the ESS state of charge of step 208, the power/energy limits of step 210, and the system limitations or states of step 212, to generate combined input-based limits 1 through n for the combination of input parameters used for the combined step 213.

During step 346, the processor 120 and/or the other controllers 134 of FIG. 1 preferably arbitrate the various individual regenerative braking changes corresponding to the various input parameters of the various iterations of the combined step 213 in order to result in a combined regenerative braking change for the braking system 100 of FIG. 1. For example, if the ESS temperature calls for a regenerative braking change of X, and the motor temperature calls for a regenerative braking change of Y, then a combined or arbitrated regenerative braking capacity for these two particular input parameters would be somewhere between X and Y, with exact amount being dependent upon the respective adaptive gains and adaptive factors for these input parameters. The resulting combined regenerative braking change is preferably used as an output of the combined step 213 for use in the determination of regenerative braking capacity.

The output of the combined step 213 for the various input parameters n of FIG. 3 are used in combination to determine a regenerative braking capacity in step 214. Preferably the regenerative braking capacity corresponds to a maximum amount of regenerative braking torque provided by the regenerative braking components 106 of FIG. 1 based on the output of the combined step 213 for the various input parameters n of FIG. 3. Preferably the regenerative braking capacity also corresponds to a corresponding maximum amount of energy recapture by the energy storage system 107 of FIG. 1 based on the output of the combined step 213 for the various input parameters n of FIG. 3 Preferably the regenerative braking capacity is calculated by the processor 120 of FIG. 1. In certain embodiments, the process may be modified so as to provide maximal life for the energy storage system components and the brake components, for example by only accepting maximal regenerative energy if certain conditions are met (for example, if the measurements of steps 202-212 are within an acceptable or safe operating range of values in with damage to braking or other vehicle components would be unlikely).

In addition, with further reference to FIG. 2, one or more braking inputs or requests are received (step 216). The braking inputs or requests preferably pertain to values pertaining to engagement of the brake pedal 102 by a driver of the vehicle. Specifically, the braking requests preferably pertain to values of brake pedal travel and/or brake pedal force as obtained by the brake pedal sensors 103 of FIG. 1 and provided to the computer system 115 of FIG. 1, where these values may be stored in the memory 122 of FIG. 1 as stored values 132 of FIG. 1 and provided to the processor 120 of FIG. 1 for processing. The braking requests are preferably received and obtained, most preferably continuously, at different points or periods in time throughout a braking event for the vehicle. During each iteration of the process 200, the processor 120 of FIG. 1 preferably processes the most recent or instantaneous values of these variables for use in the calculations and determinations performed by the processor 120 of FIG. 1 and for ultimate use in controlling braking for the vehicle.

The driver intended braking torque is determined (step 218). In a preferred embodiment, the driver intended braking torque is determined by the processor 120 of FIG. 1 using the braking inputs or requests from step 216, such as brake pedal travel and/or brake pedal force values. For example, the processor 120 of FIG. 1 may utilize the braking inputs or requests from step 202 along with one or more equations and/or lookup tables stored in the memory 122 of FIG. 1 (for example, as some of the stored values 132 of FIG. 1) in determining the driver intended braking torque during step 204.

A regenerative braking request is then determined (step 220). In a preferred embodiment, the regenerative braking request is determined in step 220 using the regenerative braking capacity and the driver intended braking torque. Specifically, if the driver intended braking torque of step 218 is less than or equal to the regenerative braking capacity of step 214, then the driver regenerative braking request of step 220 is set equal to the driver intended braking torque of step 218. Conversely, if the driver intended braking torque of step 218 is greater than the regenerative braking capacity of step 214, then the driver regenerative braking request of step 220 is set equal to the regenerative braking capacity of step 214. The regenerative braking request of step 220 is preferably determined by the processor 120 of FIG. 1.

The output of the regenerative braking request of step 220 is then provided to the regenerative braking components (step 222). In a preferred embodiment, the processor 120 of FIG. 1 provides instructions pertaining to the regenerative braking request of step 220 to the regenerative braking units 106 of FIG. 1 via the second axle 142 of FIG. 1 to implement the regenerative braking request, and regenerative braking torque is provided accordingly by the regenerative braking components 106 of FIG. 1 for the vehicle.

In addition, a determination or measurement is made as to an amount of regenerative braking torque that has been achieved (step 224). This determination is preferably made by the processor 120 of FIG. 1.

A friction braking request is also determined (step 226). In a preferred embodiment, the friction braking request is determined in step 226 using the driver intended braking torque of step 218 and the amount of regenerative braking torque achieved of step 224. Specifically, the friction braking request is preferably calculated as a difference between the driver intended braking torque of step 218 and the amount of regenerative braking torque achieved of step 224. Accordingly, the sum of the regenerative braking torque and the friction braking torque is preferably equal to the driver intended braking torque of step 218. The friction braking request is preferably determined by the processor 120 of FIG. 1.

The output of the friction braking request of step 226 is then provided to the friction braking components (step 228). In a preferred embodiment, the processor 120 of FIG. 1 provides instructions pertaining to the friction braking request of step 226 to the friction braking units 105 of FIG. 1 via the first axle 140 of FIG. 1 to implement the friction braking request, and friction braking torque is provided accordingly by the friction braking components 105 of FIG. 1 for the vehicle. Following step 228, the process preferably returns to step 202, and the process continuously repeats with new iterations using new or updated dynamic variable values and calculations throughout the operation of the vehicle.

Accordingly, improved methods and systems are provided for controlling regenerative braking of vehicles, such as hybrid electric vehicle, fuel cell, or electric vehicle applications. The improved methods and systems provide for modulation of regenerative braking torque in accordance with a desired rate of change of regenerative braking torque using values of dynamic variables, such as energy storage system temperature, energy storage system state of charge, motor temperature, motor power limits, and inverter temperature, that pertain directly or indirectly to the energy storage system's ability to absorb energy. This allows for more gradual and consistent changes in regenerative braking torque, rather than frequent oscillations up and down which can occur, for example during power spikes, using traditional methods and systems. Accordingly, the disclosed methods and systems can provide for a smoother blending of regenerative braking torque and friction torque, without the oscillations of traditional methods and systems. This can help to improve the life expectancy of components parts for the vehicle, and also can provide for a more pleasant driving experience for the driver and the passengers of the vehicle.

It will be appreciated that the disclosed methods and systems may vary from those depicted in the Figures and described herein. For example, as mentioned above, the controller 104 of FIG. 1 may be disposed in whole or in part in any one or more of a number of different vehicle units, devices, and/or systems. In addition, it will be appreciated that certain steps of the process 200 may vary from those depicted in FIGS. 2 and 3 and/or described herein in connection therewith. It will similarly be appreciated that certain steps of the process 200 may occur simultaneously or in a different order than that depicted in FIGS. 2 and 3 and/or described herein in connection therewith. It will similarly be appreciated that the disclosed methods and systems may be implemented and/or utilized in connection with any number of different types of automobiles, sedans, sport utility vehicles, trucks, and/or any of a number of other different types of vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A method for controlling regenerative braking in a vehicle having a regenerative braking system and an energy storage system, the method comprising the steps of:
   obtaining a value for a variable that affects energy absorption of the energy storage system;
   determining a regenerative braking torque capacity for the regenerative braking system using the value, wherein the regenerative braking capacity corresponds to a rate of change of the regenerative braking torque; and
   controlling the regenerative braking torque via the regenerative braking system based at least in part on the regenerative braking torque capacity.

2. The method of claim 1, wherein:
   the step of obtaining the value comprises the step of obtaining a temperature of the energy storage system; and
   the step of determining the regenerative braking torque capacity comprises the step of determining the regenerative braking torque capacity using the temperature.

3. The method of claim 1, wherein:
   the step of obtaining the value comprises the step of obtaining a state of charge of the energy storage system; and
   the step of determining the regenerative braking torque capacity comprises the step of determining the regenerative braking torque capacity using the state of charge.

4. The method of claim 1, wherein:
   the vehicle includes a motor;
   the step of obtaining the value comprises the step of obtaining a temperature of the motor; and
   the step of determining the regenerative braking torque capacity comprises the step of determining the regenerative braking torque capacity using the temperature.

5. The method of claim 1, wherein:
   the vehicle includes a motor;
   the step of obtaining the value comprises the step of obtaining a power limit of the motor; and
   the step of determining the regenerative braking torque capacity comprises the step of determining the regenerative braking torque capacity using the power limit.

6. The method of claim 1, wherein:
   the vehicle includes an inverter;
   the step of obtaining the value comprises the step of obtaining a temperature of the inverter; and
   the step of determining the regenerative braking torque capacity comprises the step of determining the regenerative braking torque capacity using the temperature.

7. The method of claim 1, wherein the vehicle also includes a friction braking system, and the method further comprises the steps of:
   obtaining an input from a driver of the vehicle during operation of the vehicle;
   determining an intended amount of braking torque using the input; and
   providing friction braking torque via the friction braking system based at least in part on the regenerative braking torque and the intended amount of braking torque, so that a sum of the regenerative braking torque and the friction braking torque is substantially equal to the intended amount of braking torque.

8. A system for controlling regenerative braking in a vehicle having a regenerative braking system and an energy storage system, the system comprising:
   a memory configured to store a value for a variable pertaining to a condition that affects energy absorption of the energy storage system; and
   a processor coupled to the memory and configured to:
      determine a regenerative braking torque capacity for the regenerative braking system using the value, wherein the regenerative braking capacity corresponds to a rate of change of the regenerative braking torque; and
      control the regenerative braking torque via the regenerative braking system based at least in part on the regenerative braking torque capacity.

9. The system of claim 8, wherein:
   the memory is further configured to store a temperature of the energy storage system; and
   the processor is further configured to determine the regenerative braking torque capacity using the temperature.

10. The system of claim 8, wherein:
    the memory is further configured to store a state of charge of the energy storage system; and
    the processor is further configured to determine the regenerative braking torque capacity using the state of charge.

11. The system of claim 8, wherein:
    the vehicle includes a motor;
    the memory is further configured to store a temperature of the motor; and
    the processor is further configured to determine the regenerative braking torque capacity using the temperature.

12. The system of claim 8, wherein:
    the vehicle includes a motor;
    the memory is further configured to store a power limit of the motor; and
    the processor is further configured to determine the regenerative braking torque capacity using the power limit.

13. The system of claim 8, wherein:
    the vehicle includes an inverter;
    the memory is further configured to store a temperature of the inverter; and
    the processor is further configured to determine the regenerative braking torque capacity using the temperature.

14. A system for controlling regenerative braking in a vehicle having a regenerative braking system and an energy storage system and a motor coupled to the regenerative braking system, the system comprising:
    a first sensor configured to measure a first value for a first variable pertaining to a state of the energy storage system;
    a second sensor configured to measure a second value for a second variable pertaining to a state of the motor; and
    a controller coupled to the first sensor and the second sensor and configured to:
       determine a regenerative braking capacity for the regenerative braking system using the first value and the second value, wherein the regenerative braking capacity corresponds to a rate of change of the regenerative braking torque; and
       control the regenerative braking torque based at least in part on the regenerative braking capacity.

15. The system of claim 14, wherein the first variable comprises a temperature of the energy storage system.

16. The system of claim 14, wherein the first variable comprises a state of charge of the energy storage system.

17. The system of claim 14, wherein the second variable comprises a temperature of the motor.

18. The system of claim 14, wherein the second variable comprises a power limit of the motor.

19. The system of claim 14, wherein the vehicle includes an inverter, and the second variable comprises a temperature of the inverter.

* * * * *